US012705136B2

(12) United States Patent
Inoue

(10) Patent No.: US 12,705,136 B2
(45) Date of Patent: Aug. 11, 2026

(54) MEMORY SYSTEM AND DATA REARRANGEMENT METHOD

(71) Applicant: Kioxia Corporation, Tokyo (JP)

(72) Inventor: Masato Inoue, Yokohama (JP)

(73) Assignee: Kioxia Corporation, Tokyo (JP)

( * ) Notice: Subject to any disclaimer, the term of this patent is extended or adjusted under 35 U.S.C. 154(b) by 7 days.

(21) Appl. No.: 18/813,116

(22) Filed: Aug. 23, 2024

(65) Prior Publication Data

US 2025/0094279 A1 Mar. 20, 2025

(30) Foreign Application Priority Data

Sep. 14, 2023 (JP) ................................ 2023-149122

(51) Int. Cl.
*G06F 11/10* (2006.01)

(52) U.S. Cl.
CPC ...... *G06F 11/1068* (2013.01); *G06F 11/1004* (2013.01)

(58) Field of Classification Search
None
See application file for complete search history.

(56) References Cited

U.S. PATENT DOCUMENTS 8,935,493 B1 * 1/2015 Dolan .................. G06F 3/0649 711/161
9,520,901 B2 12/2016 Suzuki et al.
2014/0289454 A1 9/2014 Nango et al.
2017/0147216 A1 5/2017 Hu
2018/0335959 A1 11/2018 Park
2019/0107957 A1 4/2019 Helmick et al.
2023/0073249 A1 3/2023 Nishikawa et al.
2024/0211346 A1 6/2024 Laurent et al.

FOREIGN PATENT DOCUMENTS

TW 202240594 A 10/2022

OTHER PUBLICATIONS

Kioxia, Managed Flash Background Operations Series (Year: 2022).*
ONFI, Open NAND Flash Interface (Year: 2011).*
Alessia et al, BCH and LDPC Error Correction Codes for NAND Flash Memories (Year: 2016).*
Macronix, NAND Error Correction Codes Introduction (Year: 2014).*

* cited by examiner

*Primary Examiner* — Guerrier Merant
(74) *Attorney, Agent, or Firm* — Oblon, McClelland, Maier & Neustadt, L.L.P.

(57) ABSTRACT

According to one embodiment, a controller includes a counter counting a number of accesses of data in a nonvolatile memory, in a first unit which is a unit of access to data from the host. The controller determines whether a received read command is a sequential read command or a random read command, increments a value of the counter, which corresponds to data specified by the received read command, when the received read command is the random read command, and in a process of moving first data of a first block to a second block, controls rearrangement of the first data of the first block to the second block based on the value of the counter when the first data has a size of the first unit and needs to be arranged across two pages in the second block.

20 Claims, 9 Drawing Sheets

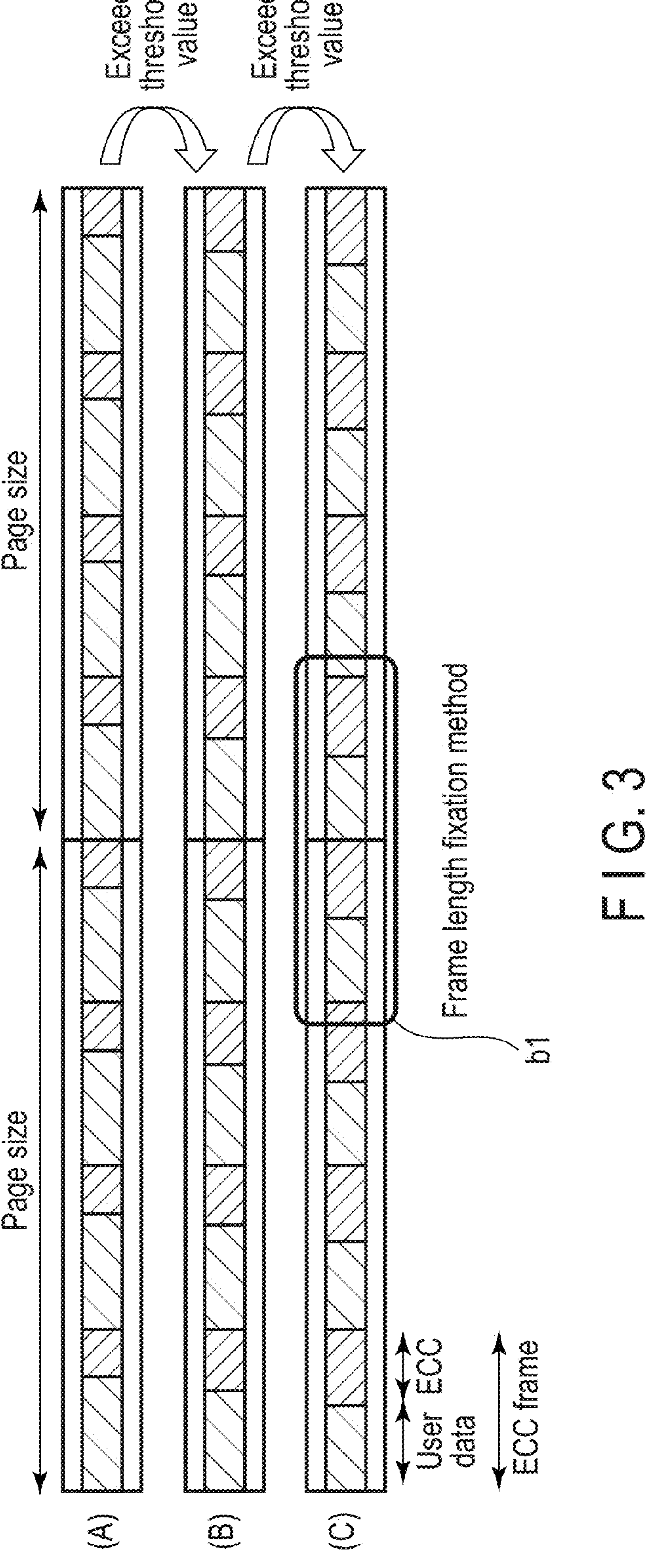
F I G. 3

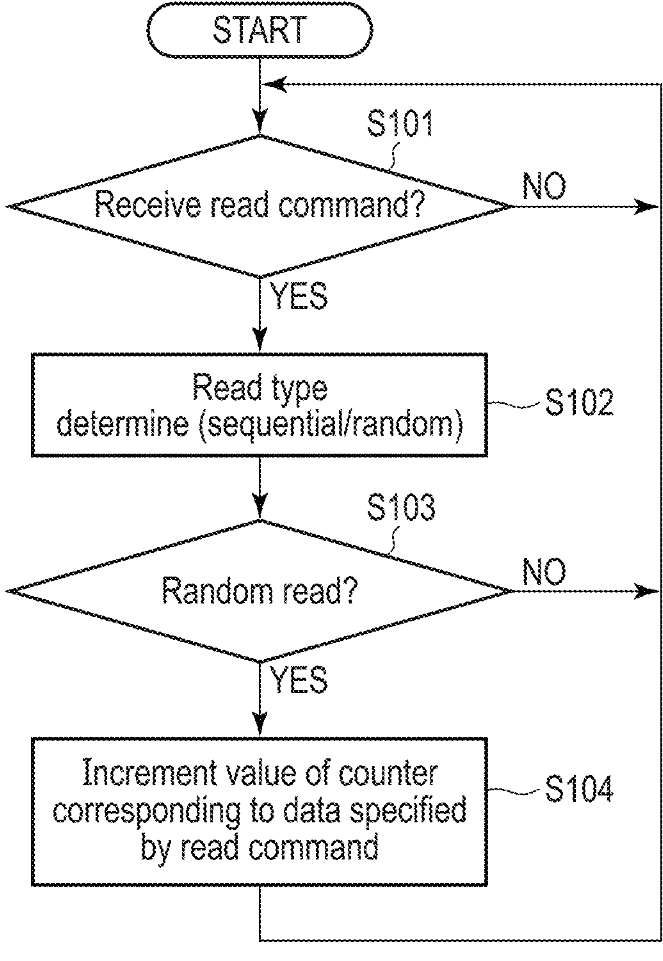
F I G. 8

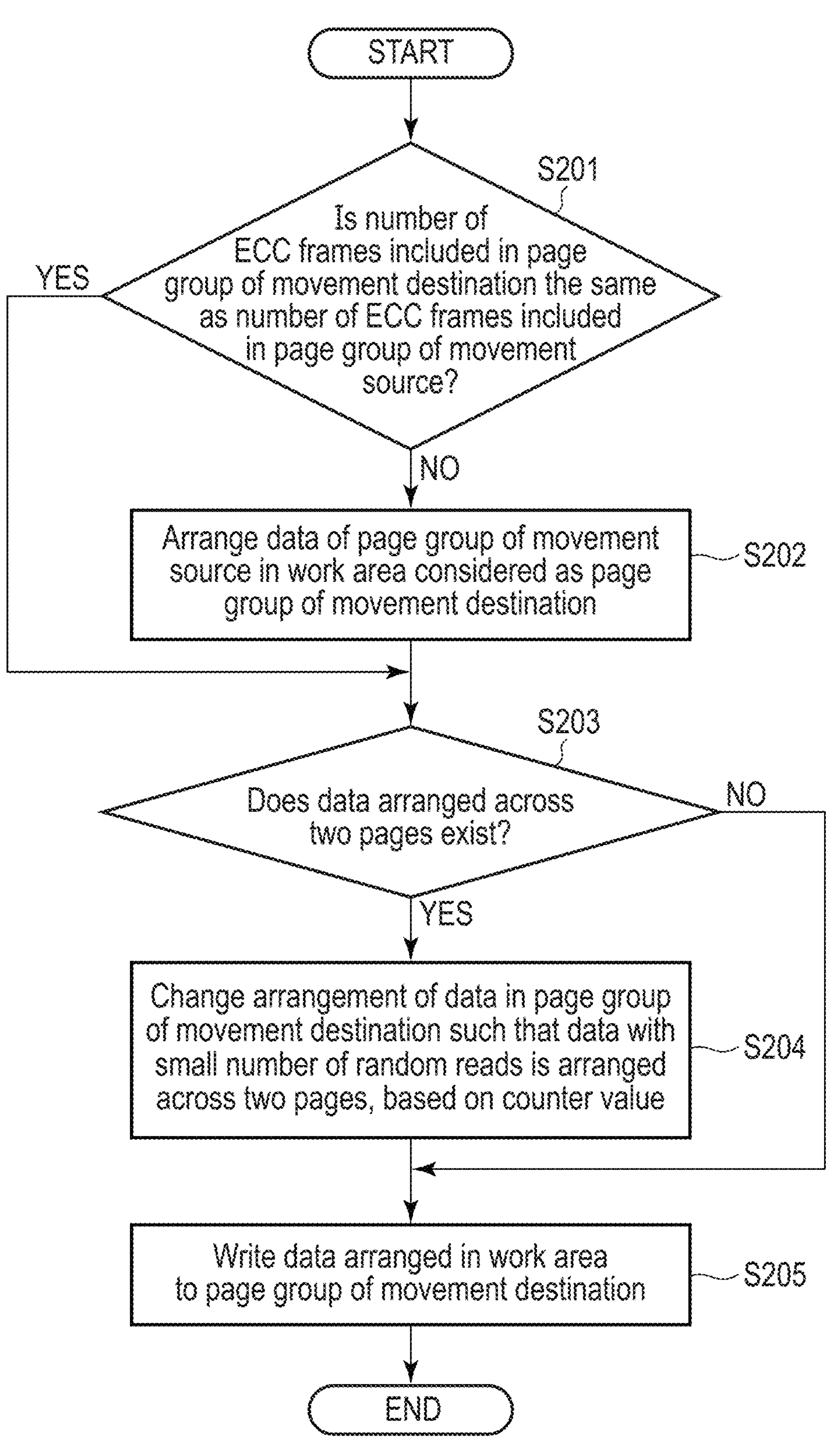
F I G. 9

MEMORY SYSTEM AND DATA REARRANGEMENT METHOD

CROSS-REFERENCE TO RELATED APPLICATIONS

This application is based upon and claims the benefit of priority from Japanese Patent Application No. 2023-149122, filed Sep. 14, 2023, the entire contents of which are incorporated herein by reference.

FIELD

Embodiments described herein relate generally to a memory system and a data rearrangement method.

BACKGROUND

Memory systems with flash memories such as solid state drives (SSD) are widely used.

In this type of memory system, as the flash memory becomes exhausted, the host access unit data for sending and receiving data to and from the memory system, which referred to as a cluster (sector), may have to be arranged across plurality of pages of the flash memory.

Arranging clusters across the plural of pages of the flash memory may degrade the performance of the memory system.

BRIEF DESCRIPTION OF THE DRAWINGS

FIG. 3 is a second diagram illustrating an example of a factor of performance deterioration caused by exhaustion of a NAND memory of the memory system of the embodiment.

FIG. 8 is a flowchart showing an operation procedure at the time of receiving a read command of the memory system of the embodiment.

FIG. 9 is a flowchart showing an operation procedure of compaction in the memory system of the embodiment.

DETAILED DESCRIPTION

In general, according to one embodiment, a memory system includes a nonvolatile memory and a controller. The nonvolatile memory includes a plurality of blocks each including a plurality of pages. The controller is connectable with a host, and controls the nonvolatile memory. The controller includes a counter counting a number of accesses of data stored in the nonvolatile memory, in a first unit, the first unit being a unit of access to data from the host. The controller determines whether a read command received from the host is a command for a sequential read or a random read; increments a value of the counter, which corresponds to data specified by the read command, when the read command is the command for the random read; and, in a process of moving first data of a first block to a second block, controls rearrangement of the first data of the first block to the second block based on the value of the counter when the first data has a size of the first unit and needs to be arranged across two pages in the second block.

Embodiments will be described hereinafter with reference to the accompanying drawings.

Figure 1:
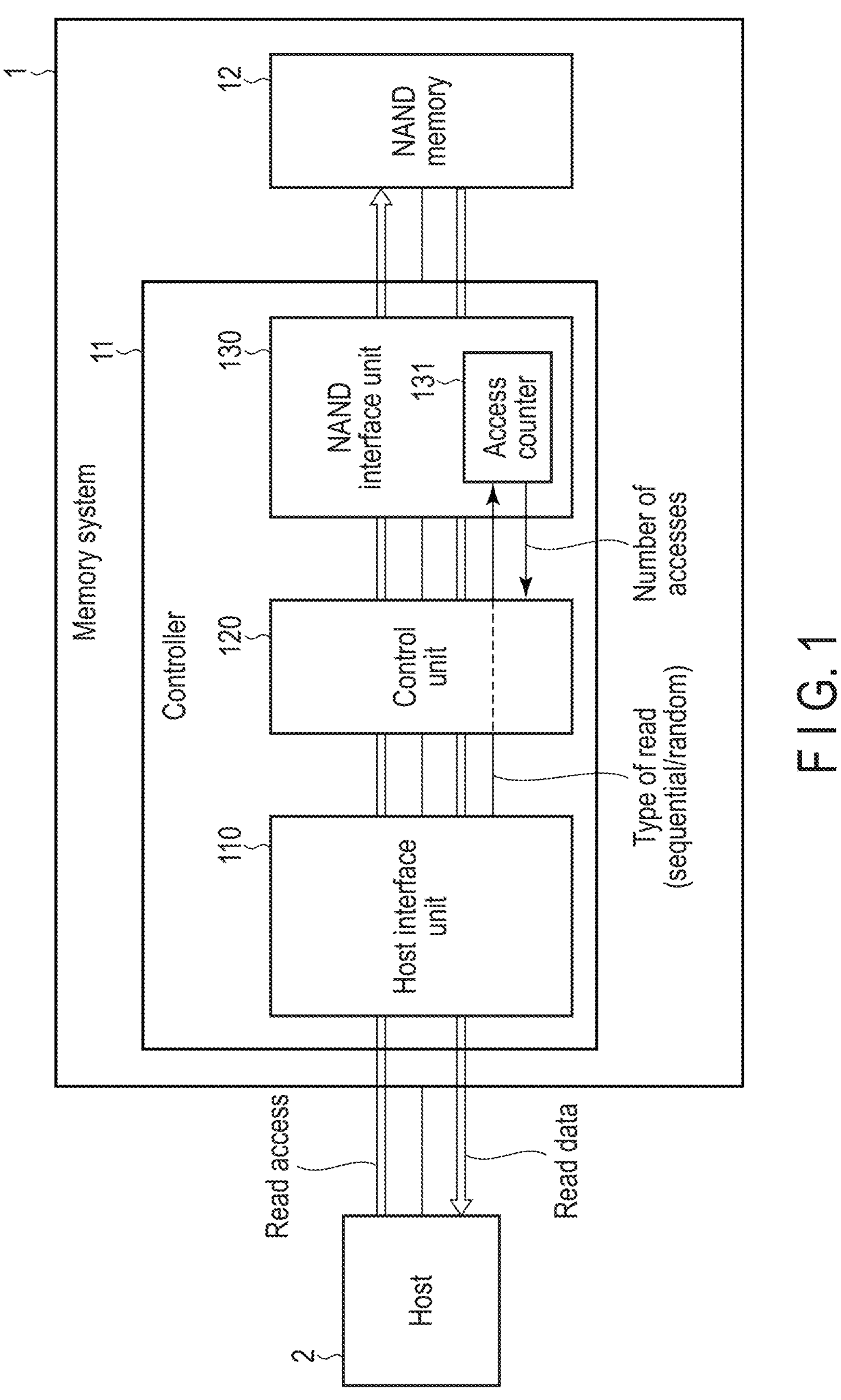
FIG. 1 is a diagram showing an example of a configuration of a memory system of an embodiment.

FIG. 1 is a diagram showing an example of a configuration of a memory system 1 of the embodiment. An example of connection between the memory system 1 and a host 2 is also shown in FIG. 1. The memory system 1 and the host 2 are connected by an interface conforming to, for example, PCI Express™ (PCIe™) standard.

The memory system 1 includes a controller 11 and a NAND memory 12.

The controller 11 controls a process of writing data to the NAND memory 12 and a process of reading data from the NAND memory 12 in response to commands from the host 2. The controller 11 autonomously executes the process of writing data to the NAND memory 12 and reading data from the NAND memory 12 for the purpose of optimizing the status of the NAND memory 12, and the like, independent of the commands from the host 2. The controller 10 is configured as, for example, a system on a chip (SoC).

The NAND memory 12 is a storage medium which includes a plurality of blocks each including a plurality of pages, and data cannot be overwritten to a storage area where data has already been written. Updating the data stored in the NAND memory 12 is executed by invalidating the original data and writing new data separately. To enable data to be rewritten to the storage area where the invalidated data is stored, the controller 11 executes a process referred to as compaction, garbage collection or the like (hereinafter referred to as compaction) as appropriate. In executing compaction, the controller 11 autonomously executes the process of writing data to the NAND memory 12 and reading data from the NAND memory 12, independently of the commands from the host 2.

The controller 11 includes a host interface unit 110, a control unit 120, and a NAND interface unit 130. These may be realized by a program executed by the CPU or realized as hardware such as electrical circuits.

The host interface unit 110 is a processing unit that functions as a front end. The host interface unit 110 controls, for example, communication with the host 2 under a protocol conforming to the NVM Express™ (NVMe™) standard.

The control unit 120 is a processing unit that functions as a core of the controller 11. The control unit 120 controls the process of writing data to the NAND memory 12 and the process of reading data from the NAND memory 12 in response to the commands from the host 2, in cooperation with the host interface unit 110 and the NAND interface unit 130. The above-described data write and read processes which are executed autonomously by the controller 11 are also executed as internal processes of the memory system 1 under the control of the control unit 120.

The NAND interface unit 130 is a processing unit that functions as a back end and controls sending and receiving data to and from the NAND memory 12. The NAND interface unit 130 includes an access counter 131. The use of the access counter 131 and the like will be described below in detail.

An example of a factor in deterioration of the performance of the memory system 1, which is caused by the exhaustion of the NAND memory 12, will be described with reference to FIG. 2 through FIG. 4.

Figure 2:
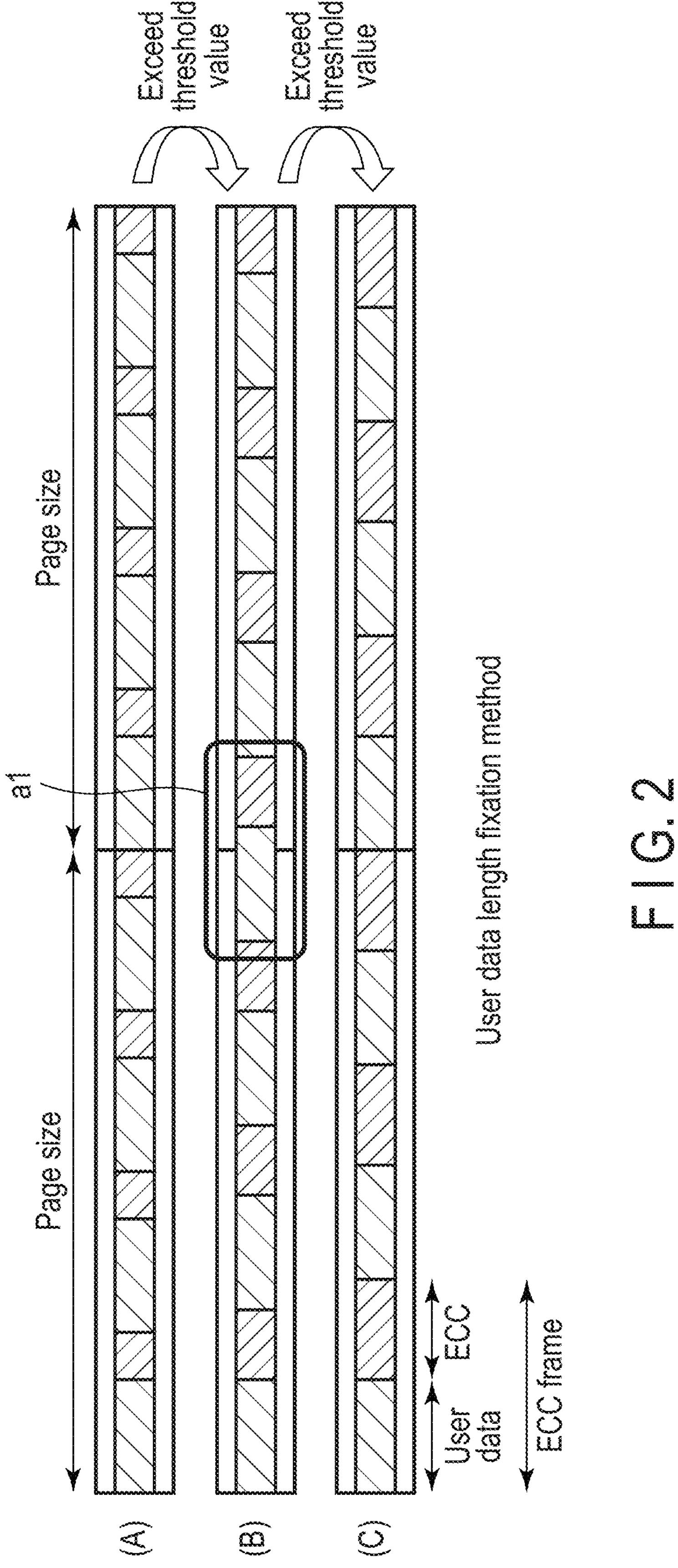
FIG. 2 is a first diagram illustrating an example of a factor of performance deterioration caused by exhaustion of a NAND memory of the memory system of the embodiment.

FIG. 2 shows an example of changes in the arrangement of ECC frames in a page of the memory system 1, which is caused by the exhaustion of the NAND memory 12 when a fixed user data length method is applied. The fixed user data length method is a method of making a frame length of Error Correcting Code (ECC) variable while fixing a user data length.

When receiving a write command from the host 2, the controller 11 generates an ECC frame. The ECC frame is a combination of the user data of a write target received from the host 2 and the ECC (parity) to detect and correct errors when this user data is read. The controller 11 writes the generated ECC frame to the NAND memory 12.

The NAND memory 12 includes a plurality of blocks. The block is a data erase unit in the NAND memory 12. Each of the plurality of blocks includes a plurality of pages. The page is a data write unit in the NAND memory 12. When storing the ECC frame in each of the blocks, the controller 11 controls the arrangement of the ECC frame for each of a predetermined number of pages in the plurality of pages included in the block. In other words, the controller 11 controls the arrangement of the ECC frames by using the storage area on a predetermined number of pages as one compartment. FIG. 2 shows an example of arranging the ECC frames by using the storage area for two pages as one compartment.

As the NAND memory 12 becomes exhausted, the errors which may occur in the user data increase. In accordance with this, the code length of the ECC for error correction needs to be increased. When the ECC frames are generated using the fixed user data length method, the length of the user data in each ECC frame is constant while the code length of the ECC is variable. For this reason, the length of the ECC frame becomes longer as the code length of the ECC becomes longer. In other words, the ECC frame in the fixed user data length method is variable in length. In addition, the length of user data in the fixed user data length method is the same length as the above-described cluster, i.e., the access unit of data from the host 2.

FIG. 2 shows an example in which the number of ECC frames that can be arranged every two pages decreases to eight, seven, and six as the NAND memory 12 becomes exhausted ((A)→(B)→(C)). When the condition that the ECC code length needs to be increased (i.e., the degree of exhaustion of the NAND memory 12 exceeds a certain width) is met, the ECC code length becomes longer and the number of ECC frames that can be arranged on one page decreases. In FIG. 2, "exceed threshold value" indicates that the condition under which the ECC code length needs to be increased is met. Reducing the number of ECC frames that the controller 11 writes to a page group for one compartment is also referred to as "cluster collapsing" or the like.

In addition, FIG. 2 also shows a status in which an ECC frame is arranged across two pages (al), i.e., a cluster is arranged across two pages. When a cluster is arranged across two pages, the performance of the memory system 1 may be deteriorated. An influence of the cluster arranged across two pages to the performance of the memory system 1 will be described below.

In contrast, FIG. 3 shows an example of the performance degradation of the memory system 1 caused by the exhaustion of the NAND memory 12 in a case where the fixed frame length method in which the ECC frame length is fixed and the user data length is variable, is applied. FIG. 3 also shows an example in which the ECC frames are arranged using the storage area for two pages as one compartment.

FIG. 3 shows an example in which the ratio of the ECC code length in the ECC frame arranged on each page increases as the NAND memory 12 becomes exhausted ((A)→(B)→(C)). As described above, the ECC code length for error correction becomes longer as the NAND memory 12 becomes exhausted. In the fixed frame length method, the length of the user data and the ECC code length are variable in order to keep the length of each ECC frame constant. For this reason, the length of the user data in the ECC frame becomes shorter.

In the fixed frame length method, the number of ECC frames that can be arranged on each page does not fluctuate as the NAND memory 12 becomes exhausted. In other words, it is not possible for an ECC frame to be arranged across two pages. However, since the user data length in each ECC frame becomes shorter, a cluster which is the data of the access unit from the host 2 may be arranged in two separate ECC frames. The two ECC frames indicated by code b1 in FIG. 3 are two ECC frames in which a certain cluster is divided and arranged, and two ECC frames each arranged to be divided into two pages.

In other words, even in the fixed frame length method as well, a status may occur in which a cluster is arranged across two pages. When a cluster is arranged across two pages, the performance of the memory system 1 may be deteriorated.

Then, an influence of the cluster arranged across two pages to the performance of the memory system 1 will be described with reference to FIG. 4. FIG. 4 shows an example in which the fixed user data length method is applied.

It is assumed that the NAND memory 12 includes two planes and that data is written and read on each plane. In this case, the controller 11 can write and read data to and from the NAND memory 12 for every two ECC frames, parallel to each plane.

In addition, it is also assumed that one compartment of each block is formed by two pages belonging to two planes different from each other. FIG. 4 shows an example of arrangement of ECC frames within two pages of one compartment in block M, and an example of arrangement of ECC frames within two pages of one compartment in block N.

It is assumed that the memory system 1 is currently reading a cluster of block M in plane 1 from the NAND memory 12 (c1). At this time, for example, if a read command targeting the cluster of block N in plane 0 is assumed to be received from the host 2, the controller 11 can immediately execute the process of reading the cluster from the NAND memory 12 (c2). In contrast, for example, if a read command targeting a cluster arranged across block N of plane 0 and block N of plane 1 is received from the host 2, the controller 11 cannot execute the read process from the NAND memory 12 of that cluster until the read of the preceding cluster indicated by code c1 is completed (c3).

In other words, the latency of a read command process for a cluster arranged only on either plane 0 or plane 1 is determined by the status of the plane in which the own cluster is located. In contrast, the latency in the read command process of the cluster arranged across planes 0 and 1 is determined by the statuses of both of the two planes on which the cluster is located. For this reason, reading the cluster arranged across two planes may take longer than reading the cluster arranged on only one plane.

Thus, when the cluster is arranged across two pages, the performance of memory system 1 may be deteriorated. Furthermore, if data that is read more frequently is written to the cluster arranged across two planes, the performance of the memory system 1 is more likely to be deteriorated.

Figure 4:
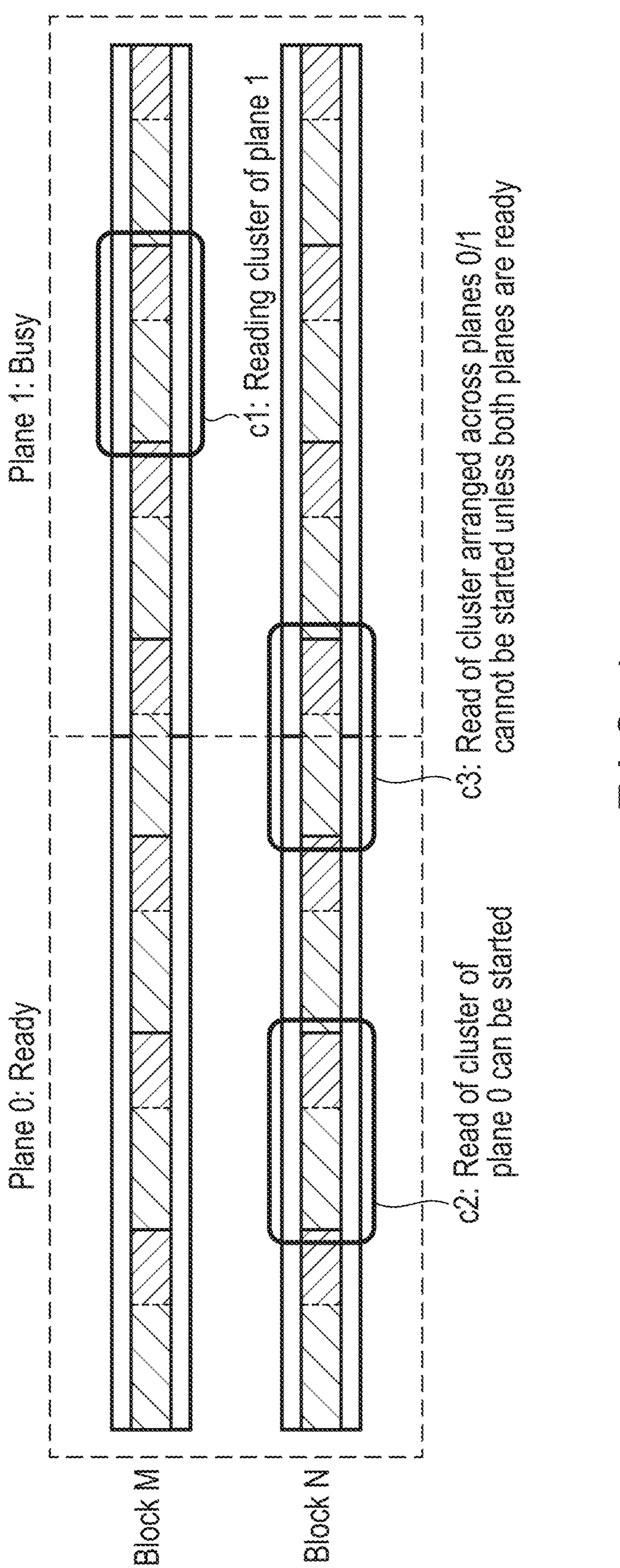
FIG. 4 is a third diagram illustrating an example of a factor of performance deterioration caused by exhaustion of a NAND memory of the memory system of the embodiment.

FIG. 4 shows an example of a case where the fixed user data length method is applied, but the situation is the same in a case where the fixed frame length method is applied. A case where two ECC frames including a certain cluster are arranged in two different pages and a read command targeting the cluster is received from host 2 will be considered. At this time, a situation may arise in which reading one ECC frame corresponding to the cluster can be executed immediately, but reading the other ECC frame needs to be awaited.

The memory system 1 of the present embodiment can suppress the deterioration in performance caused by the cluster arranged across two pages due to the exhaustion of the NAND memory 12. The mechanism of the memory system 1 of the present embodiment will be described with reference to FIG. 1.

The host 2 issues a read command to the memory system 1 to read plural clusters. In a case where the host 2 executes either sequential read or random read, a certain number or more of read commands are issued continuously since the data for plural clusters is the target. When the host 2 issues a read command, the read command is received by the host interface unit 110 of the controller 11.

The host interface unit 110 transfers the read command to the control unit 120. Receiving the read command, the control unit 120 first translates a logical address specified by the read command into a physical address. This process is referred to as address resolution or the like. The logical address is an address indicative of a position in the logical address space, i.e., the logical position of the NAND memory 12. The physical address is an address indicative of a position in the physical address space, i.e., the physical position of the NAND memory 12. For the address resolution, the control unit 120 manages information that maintains the correspondence between the logical address and the physical address. The information that maintains the correspondence is referred to as a logical-to-physical address translation table or the like.

The control unit 120 sends instructions to the NAND interface unit 130 to read data (ECC frame) from the position indicated by the translated physical address in the NAND memory 12. The NAND interface unit 130 executes communication with the NAND memory 12 to output the instructed data (ECC frame) to the NAND memory 12. The NAND interface unit 130 delivers the data (ECC frame) obtained from the NAND memory 12 to the control unit 120.

When receiving the ECC frame, the control unit 120 checks whether an error occurs in the user data in the ECC frame, using the ECC in the ECC frame. If an error occurs, the control unit 120 corrects the error with the ECC. The control unit 120 transfers the user data with the error corrected to the host interface unit 110 as necessary.

The host interface unit 110 sends the user data received from the control unit 120 to the host 2 as a response to the read command.

In addition to the basic operations at the time of receiving the read command described above, the host interface unit 110 first determines whether the read command received from the host 2 is a command related to a sequential read or a random read, in the memory system 1 of the embodiment.

As described above, when the host 2 executes either the sequential read or the random read, a certain number of read commands are issued continuously. Therefore, the host interface unit 110 determines whether or not the logical addresses specified in these read command groups are continuous. The host interface unit 110 determines that the read command is the command for the sequential read if the addresses are continuous, and determines that the read command is the command for the random read if the addresses are not continuous.

The host interface unit 110 notifies the NAND interface unit 130 via the control unit 120 of the determination result of sequential read or random read at the time of receiving the read command. The NAND interface unit 130 receiving the determination result that the read command is the command for the random read, of the notification, increments the value of the counter corresponding to read target data to be read by the read command, in the access counter 131. In other words, the access counter 131 is a counter for counting the number of random reads of each data.

Incidentally, the determination of whether the read command is the command for the sequential read or the random read may be executed by the NAND interface unit 130 instead of the host interface unit 110. In this case, the NAND interface unit 130 determines whether or not the physical addresses of an instruction group continuously sent from the control unit 120 are continuous. The NAND interface unit 130 determines that the read command is the command for the sequential read if the addresses are continuous, and determines that the read command is the command for the random read if the read command is not continuous.

Further, in the fixed user data length method, the NAND interface unit 130 may use the unit of data for counting the number of random reads in the access counter 131 for each ECC frame, or each cluster, i.e., in a unit of access from the host 2. In the fixed user data length method, counting the number of random reads for each ECC frame is substantially the same as counting the number of random reads for each cluster, i.e., in a unit of access from the host 2. In contrast, in the fixed frame length method, counting the number of random reads is desirably executed for each cluster, i.e., in a unit of access from the host 2. In the fixed frame length method, managing a combination of two ECC frames distributed by the cluster is unnecessary by counting the number of random reads for each cluster. In other words, it is possible to prevent counting the number of random reads of the clusters distributed in two ECC frames twice the actual number, and the like.

Next, a method of controlling the arrangement of clusters to suppress the deterioration of performance caused by the exhaustion of the flash memory, using the number of random reads counted by the access counter 131, will be described with reference to FIG. 5.

As described above, the controller 11 executes the compaction as appropriate. A typical example of the compaction is to move data excluding invalidated data in N (N is a natural number greater than or equal to two) blocks to M (M is a natural number less than N) blocks, such that the storage area of N-M blocks can be reused. In addition, an example of the timing for executing the compaction is the point in time when the number of remaining blocks to which data can be written falls below a threshold value.

Figure 5:
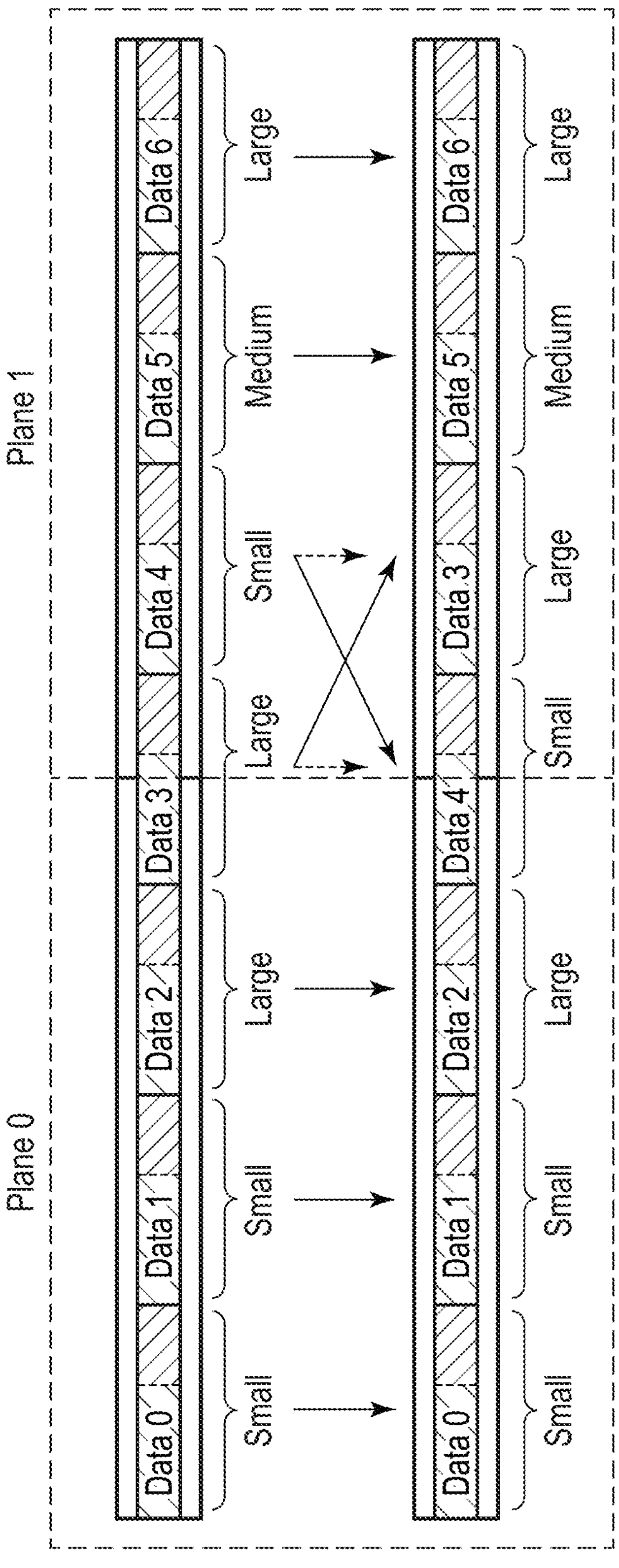
FIG. 5 is a diagram illustrating a method of controlling arrangement of clusters executed by the memory system of the embodiment.

FIG. 5 is a diagram showing the control of arrangement of the clusters executed by the memory system. In FIG. 5, two pages in the upper row are pages for one compartment in a movement destination block in the compaction. In contrast, two pages in the lower row are pages for one compartment in the movement destination block in the compaction. In FIG. 5, it is assumed that the fixed user data length method is applied. In FIG. 5, "small", "large", and "medium" indicate the relative size of the number of random reads counted by the access counter 131 within the compartment. In FIG. 5, "small", "medium", and "large" are shown in the order of smaller number of random reads. The controller 11 determines "small", "large", and "medium" by relatively evaluating the number of random reads counted by the access counter 131, in the first compartment.

As shown in FIG. 5, the ECC frame including data 3 with a large number of random reads is arranged across two pages before executing the compaction. When executing the compaction, the controller 11 obtains the value of the access counter 131 from the NAND interface unit 130 and, based on this value, controls the rearrangement of the ECC frame to the movement destination block.

More specifically, the controller 11 moves the ECC frame of the movement source block to the movement destination block such that the ECC frame including the data with a small number of random reads is arranged across the two pages instead of the ECC frame including the data 3 with a large number of random reads.

The controller 11 arranges the ECC frame including the data with a "small" number of random reads across two pages instead of the ECC frame including the data with a "large" number of random reads. But the controller 11 may arrange the ECC frame including the data with a "small" number of random reads across two pages instead of the ECC frame including the data with a "medium" number of random reads.

The controller 11 selects, for example, the ECC frame including the data with the smallest number of random reads among the data to be moved as a candidate to be arranged across two pages.

The controller 11 may control, for example, the arrangement of ECC frames on each of two or more pages. When the controller 11 controls the arrangement of the ECC frames on each four pages, boundaries of three pages exist within one compartment formed of four pages. When ECC frames are arranged on two of the three page boundaries, the controller 11 selects two data in the order of a smaller number of random reads, and arranges two ECC frames including the data on the boundary of two pages. In other words, the controller 11 arranges the ECC frames such that the two ECC frames including the data are arranged across the two pages.

In other words, the memory system 1 of the embodiment reduces the access frequency of the clusters arranged across two pages by arranging the ECC frames including the data with a small number of random reads across the two pages, thereby implementing the suppression of deterioration of performance.

Even If the number of random reads of the data arranged across two pages may be determined to be "large" in the compartment including the page, but if the number of random reads may be determined to be "small" relative to the memory system 1 as a whole, the controller 11 may omit the control of rearrangement caused by replacement of the ECC frames. For example, if the number of random reads of the data arranged across two pages is less than the threshold value, this data may be arranged across two pages at the movement destination as well. In other words, the data whose number of random reads is greater than or equal to a threshold value may be controlled not to be arranged across two pages. The threshold value may be determined based on the upper limit of latency of the read command process. In this case, the generation of overhead can be suppressed as much as possible within the range where the performance can be maintained.

Incidentally, when the fixed frame length method is applied, the controller 11 arranges two ECC frames including the cluster with the smallest number of random reads among the data to be moved, on different pages.

Incidentally, FIG. 5 shows an example of a case where the number of ECC frames that can be arranged on two pages for one compartment is the same for the movement source block and the movement destination block of the compaction. The degree of exhaustion of the NAND memory 12 at the time of writing the data to the movement destination block by the compaction may be more advanced than the degree of exhaustion of the NAND memory 12 at the time of writing the data to the movement source block. At this time, the number of ECC frames that can be arranged in the movement destination block is less than that in the movement source block.

Figure 6:
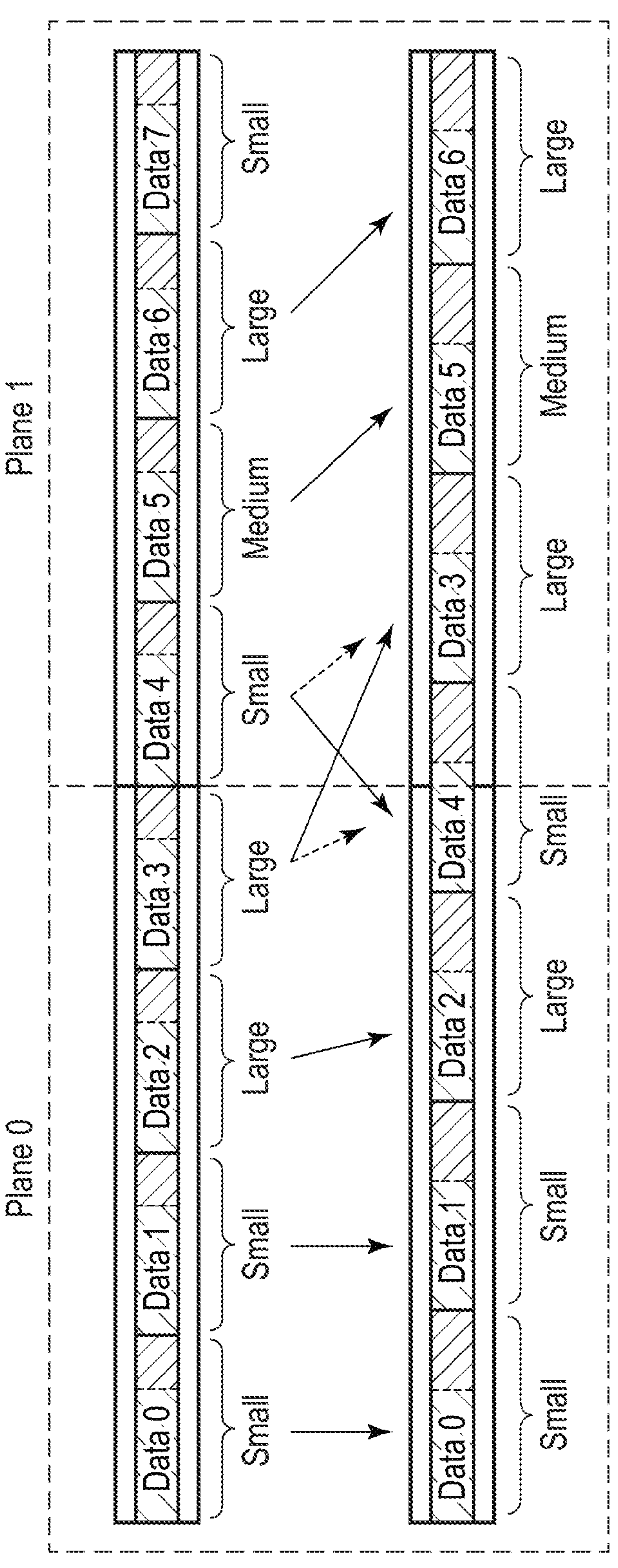
FIG. 6 is a diagram illustrating a method responding to a case where clusters arranged across two pages occur during compaction of the memory system of the embodiment.

In this case, there is no cluster that is arranged across two pages in the movement source block, but a cluster arranged across two pages may occur in the movement destination block. The control of arrangement control of clusters in a case where clusters arranged across two pages are generated in the movement destination block during the compaction will be described with reference to FIG. 6. FIG. 6 is a diagram showing the control of arrangement of the clusters executed by the memory system. It is assumed that the fixed user data length method is applied.

During the compaction, the controller 11 reads the ECC frame from the movement source block, checks for errors in the user data by using the ECC. If an error is detected, the controller 11 corrects the error using the ECC. In moving the user data to the movement destination block, the controller 11 generates a new ECC and generates an ECC frame including the user data and the new ECC. The code length of the ECC generated after the NAND memory 12 is exhausted is longer than the code length of the previous ECC. In accordance with this, the ECC frame length becomes longer in the fixed user data length method.

FIG. 6 shows an example where an ECC frame needs to be arranged across two pages during the compaction to move data from the movement source block before "cluster collapsing" to the movement destination block after "cluster collapsing".

The controller 11 uses, for example, the storage area of a Static Random Access Memory (RAM) (SRAM) (not shown) in controller 11 or a Dynamic RAM (DRAM) (not shown) connected to the controller 11 as a work area. The controller 11 first attempts to arrange the ECC frames that are scheduled to be written to the movement destination block, in the work area designed to be the movement destination block, and checks whether or not the ECC frame arranged across two pages in the movement destination block exists. If the ECC exists, the controller 11 controls writing the ECC frame to the movement destination block such that the ECC frame including the data with a small number of random reads is arranged across the two pages.

FIG. 6 shows an example where an ECC frame including data 4 with a small number of random reads is arranged across two pages. When the ECC frame is mechanically rearranged to the movement destination block according to the order in the movement source block, the ECC frame including data 3 with a large number of random reads is arranged across two pages. Therefore, the controller 11 arranges the ECC frame including data 4 with a small number of random reads across the two pages, instead of the ECC frame including data 3 with a large number of random reads.

Thus, the memory system 1 of the embodiment can adaptively control the rearrangement of data in accordance with the progress of exhaustion of the NAND memory 12, in order to suppress the deterioration in performance.

In addition, in the fixed frame length method, clusters are not distributed into two ECC frames in the movement source block, but clusters may be distributed into two ECC frames in the movement destination block as the NAND memory 12 becomes exhausted. In addition, two ECC frames in which the clusters are distributed may have to be arranged on two separate pages. In such a case, the controller 11 may select two ECC frames in which the data (clusters) with a small number of random reads are distributed, as candidates for the ECC frames to be arranged on two separate pages.

Figure 7:
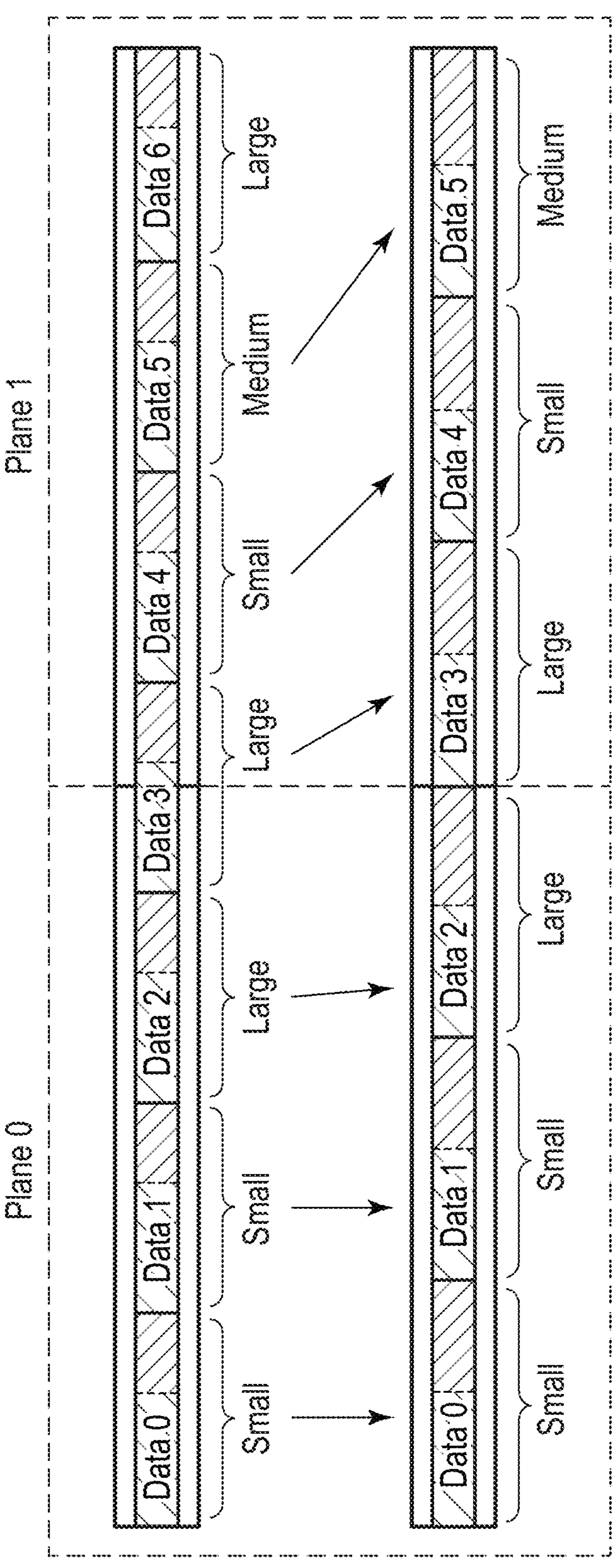
FIG. 7 is a diagram showing an example in which the memory system of the embodiment adaptively controls the arrangement of the clusters following the exhaustion of the NAND memory.

Incidentally, "cluster collapsing" proceeds and, conversely, ECC frames are arranged across two pages in the movement source block of the compaction, but ECC frames may not have to be arranged across two pages in the movement destination block. FIG. 7 shows an example of a case where ECC frames are no longer arranged across two pages as a result of progress of the "cluster collapsing".

In addition, in the fixed frame length method, for example, if the number of ECC frames that can be arranged on each page is a multiple of the number of ECC frames distributed to clusters since the "cluster collapsing" proceeds, clusters are arranged across two pages in the movement source block, but there may be no clusters arranged across the two pages in the movement destination block.

FIG. 8 is a flowchart showing an operation procedure at the time of receiving the read command of the memory system 1 of the embodiment.

When receiving a read command (S101: YES), the controller 11 determines the read type of the read command (S102). More specifically, the controller 11 determines that the read type is the sequential read or the random read.

If the read type is the random read (S103: YES), the controller 11 increments the value of the access counter 131 corresponding to the data specified by the read command (S104). If the read type is the sequential read (S103: NO), the controller 11 skips the process of step S104, i.e., incrementing the value of the access counter 131 corresponding to the data.

FIG. 9 is a flowchart showing an operation procedure of compaction in the memory system 1 of the embodiment.

The controller 11 first determines whether the number of ECC frames in the page group of the movement destination is the same as the number of ECC frames included in the page group of the movement source (S201). If the number of the ECC frames is the same (S201: Yes), the process in S202 is skipped. If the number of the ECC frames is not the same (S201: No), the data of the page group of the movement source is arranged in a work area which is considered as a page group of the movement destination (S202). The controller 11 checks whether or not data arranged across two pages exists (S203).

If data arranged across two pages exists (S203: YES), the controller 11 changes the arrangement of the data in the page group of the movement destination in the work area, such that the data with a small number of random reads is arranged across two pages, based on the value of the access counter 131 (S204). If there is no data arranged across two pages (S203: NO), the controller 11 skips the process in step S204.

Then, the controller 11 writes the data arranged in the work area to the page group of the movement destination (S205).

As described above, the memory system 1 of the embodiment counts the number of random reads and controls the cluster with a small number of random reads to be arranged across two pages in the movement destination block. In other words, the memory system 1 moves the data such that the access frequency of clusters arranged across two pages is reduced.

The memory system 1 of the embodiment can thereby reduce the deterioration in performance associated with the exhaustion of the NAND memory 12.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:

a nonvolatile memory including a plurality of blocks each including a plurality of pages; and a controller connectable with a host, and configured to control the nonvolatile memory, wherein the controller includes a counter counting a number of accesses of data stored in the nonvolatile memory in a first unit, the first unit being a unit of access to data from the host, and the controller is configured to:

determine whether a read command received from the host is a command for a sequential read or a random read;

increment a value of the counter, which corresponds to data specified by the read command, when the read command is the command for the random read; and in a process of moving first data of a first block to a second block, determine, based on the value of the counter for the first data, whether the first data is to be rearranged across two pages in the second block or rearranged in one page in the second block.

2. The memory system of claim 1, wherein the controller is further configured to generate a frame including user data received from the host and an error correction code for detecting and correcting an error of the user data, and write the frame to the nonvolatile memory, and a length of the user data is the first unit.

3. The memory system of claim 1, wherein the controller is further configured to generate a frame including user data received from the host and an error correction code for detecting and correcting an error of the user data, and write the frame to the nonvolatile memory, and a length of the frame is not changed before and after the process of moving the first data of the first block to the second block.

4. The memory system of claim 1, wherein the controller is configured to control arrangement of data to each block of the nonvolatile memory for each first number of pages among the plurality of pages included in each block, and in a case where the first data has the smallest counter value among the data arranged in the first number of pages, control the rearrangement of the first data from the first block to the second block such that the first data with the smallest counter value among the first data to be arranged in the first number of pages is rearranged across two pages.

5. The memory system of claim 1, wherein the controller is configured to control arrangement of data to each block of the nonvolatile memory for each first number of pages among the plurality of pages included in each block, and in a case where the first data has a value of the counter is greater than or equal to a threshold value, control the rearrangement of the first data from the first block to the second block such that the first data is not rearranged across two pages.

6. The memory system of claim 1, wherein the controller is configured to compare a first logical address indicative of a logical position of the nonvolatile memory specified by a first read command with a second logical address specified by a second read command subsequent with the first read command, and determine whether the first read command and the second read command are the commands for the sequential read or the random read.

7. The memory system of claim 1, wherein the controller is configured to compare a first physical address with a second physical address, the first physical address being indicative of a physical position of the nonvolatile memory associated with a first logical address indicative of a logical position of the nonvolatile memory specified by a first read command, the second physical address being associated with a second logical address specified by a second read command subsequent with the first read command, and determine whether the first read command and the second read command are the commands for the sequential read or the random read.

8. The memory system of claim 1, wherein the controller is configured to generate each of a plurality of frames including user data received from the host and an error correction code for detecting and correcting an error of the user data, and write the plurality of frames to the nonvolatile memory, when receiving a write command from the host, when the controller moves the first data from the first block to the second block by a first method, count the number of the accesses to the data by the counter, for each of a plurality of the frames stored in the second block, when the controller moves the first data from the first block to the second block by a second method, count the number of the accesses to the data by the counter, for each of the first unit of the first data stored in the second block, the first method makes a length of the frame of to be stored in the second block different from a length of the frame stored in the first block, a length of the error correction code included in the frame to be stored in the second block different from a length of the error correction code included in the frame stored in the first block, and a length of the user data included in the frame to be stored in the second block equal to a length of the user data included in the frame stored in the first block, and the second method makes a length of the frame to be stored in the second block equal to a length of the frame stored in the first block, a length of the error correction code included in the frame to be stored in the second block different from a length of the error correction code included in the frame stored in the first block, and a length of the user data included in the frame to be stored in the second block different from a length of the user data included in the frame stored in the first block.

9. The memory system of claim 8, wherein the controller is configured to control the rearrangement of the first data of the first block to the second block such that a frame including data in which a value of the counter is greater than or equal to a threshold value is not arranged across two pages, when the frame is generated in the first method, and control the rearrangement of the first data of the first block to the second block such that two frames to which data with a value of the counter greater than or equal to a threshold value is distributed are not arranged on two separate pages, when the frame is generated in the second method.

10. The memory system of claim 1, wherein the controller is configured to skip incrementing the value of the counter, when the read command is the command for the sequential read.

11. A data rearrangement method executed by a controller connectable with a host, and configured to control a non-volatile memory including a plurality of blocks each including a plurality of pages, the method comprising:

determining that a read command received from the host is the command for a random read;

in response to determining that the read command is the command for the random read, incrementing a value of a counter corresponding to data specified by the read command, of counters for counting a number of accesses of data stored in the nonvolatile memory for each access unit from the host or for each frame, the frame including user data received from the host and an error correction code for detecting and correcting an error of the user data; and in a process of moving first data of a first block to a second block, determining that, based on the value of the counter for the first data, the first data is to be rearranged across two pages in the second block; and determining that, based on the value of the counter for the first data, the first data is to be rearranged across in one page in the second block.

12. The method of claim 11, further comprising:

generating a frame including user data received from the host and an error correction code for detecting and correcting an error of the user data; and writing the frame to the nonvolatile memory, wherein a length of the user data is the access unit.

13. The method of claim 11, further comprising:

generating a frame including user data received from the host and an error correction code for detecting and correcting an error of the user data; and writing the frame to the nonvolatile memory, wherein a length of the frame is not changed before and after the process of moving the first data of the first block to the second block.

14. The method of claim 11, further comprising:

controlling arrangement of the first data to each block of the nonvolatile memory for each first number of pages among the plurality of pages included in each block;

detecting that the first data has the smallest counter value among the data arranged in the first number of pages; and in response to detecting that the first data has the smallest counter value among the data arranged in the first number of pages, controlling the rearrangement of the first data from the first block to the second block such that the first data is rearranged across two pages.

15. The method of claim 11, further comprising:

controlling arrangement of data to each block of the nonvolatile memory for each first number of pages among the plurality of pages included in each block;

detecting that the first data has a value of the counter is greater than or equal to a threshold value; and in response to detecting that the first data has a value of the counter is greater than or equal to a threshold value, controlling the rearrangement of the first data from the first block to the second block such that the first data is not rearranged across two pages.

16. The method of claim 11, further comprising:

comparing a first logical address indicative of a logical position of the nonvolatile memory specified by a first read command with a second logical address specified by a second read command subsequent with the first read command; and determining that the first read command and the second read command are the commands for the random read.

17. The method of claim 11, further comprising:

comparing a first physical address with a second physical address, the first physical address being indicative of a physical position of the nonvolatile memory associated with a first logical address indicative of a logical position of the nonvolatile memory specified by a first read command, the second physical address being associated with a second logical address specified by a second read command subsequent with the first read command; and determining that the first read command and the second read command are the commands for the random read.

18. The method of claim 11, further comprising:

generating each of a plurality of frames including user data received from the host and an error correction code for detecting and correcting an error of the user data, and writing the plurality of frames to the nonvolatile memory;

in the first data moved from the first block to the second block by a first method, counting the number of the accesses to the data by the counter, for each of the frames of the second block; and in the first data moved from the first block to the second block by a second method, counting the number of the accesses to the data by the counter, for each of the first unit, wherein the first method makes a length of the frame of to be stored in the second block different from a length of the frame stored in the first block, a length of the error correction code included in the frame to be stored in the second block different from a length of the error correction code included in the frame stored in the first block, and a length of the user data included in the frame to be stored in the second block equal to a length of the user data included in the frame stored in the first block, and the second method makes a length of the frame to be stored in the second block equal to a length of the frame stored in the first block, a length of the error correction code included in the frame to be stored in the second block different from a length of the error correction code included in the frame stored in the first block, and a length of the user data included in the frame to be stored in the second block different from a length of the user data included in the frame stored in the first block.

19. The method of claim 18, further comprising:

in generating the frame by the first method, controlling the rearrangement of the first data of the first block to the second block such that a frame including data in which a value of the counter is greater than or equal to a threshold value is not arranged across two pages; and in generating the frame by the second method, controlling the rearrangement of the first data of the first block to the second block such that two frames to which data with a value of the counter greater than or equal to a threshold value is distributed are not arranged on two separate pages.

20. The method of claim 11, further comprising:

skipping incrementing the value of the counter, which corresponds to data specified by the read command, in response to determining that the read command is the command for a sequential read.

* * * * *